United States Patent
Shen

(10) Patent No.: US 11,007,477 B2
(45) Date of Patent: *May 18, 2021

(54) COMPOSITION FOR CONTROLLING AMBIENT HUMIDITY

(71) Applicant: SHANGHAI HENGYUAN MACROMOLECULAR MATERIALS CO., LTD., Shanghai (CN)

(72) Inventor: Sandra Shen, Shanghai (CN)

(73) Assignee: SHANGHAI HENGYUAN MACROMOLECULAR MATERIALS CO., LTD, Shanghai (CN)

( * ) Notice: Subject to any disclaimer, the term of this patent is extended or adjusted under 35 U.S.C. 154(b) by 249 days.

This patent is subject to a terminal disclaimer.

(21) Appl. No.: 16/084,974

(22) PCT Filed: Jul. 20, 2018

(86) PCT No.: PCT/CN2018/096461
§ 371 (c)(1),
(2) Date: Sep. 14, 2018

(87) PCT Pub. No.: WO2020/000541
PCT Pub. Date: Jan. 2, 2020

(65) Prior Publication Data
US 2020/0298176 A1    Sep. 24, 2020

(30) Foreign Application Priority Data
Jun. 29, 2018    (CN) .......................... 201810700453.3

(51) Int. Cl.
B01D 53/28    (2006.01)

(52) U.S. Cl.
CPC ........ B01D 53/28 (2013.01); *B01D 2252/103* (2013.01); *B01D 2252/2026* (2013.01); *B01D 2252/504* (2013.01)

(58) Field of Classification Search
CPC ..................................................... B01D 53/28
See application file for complete search history.

(56) References Cited

U.S. PATENT DOCUMENTS

| | | | | |
|---|---|---|---|---|
| 6,196,227 | B1 * | 3/2001 | Tsushima | A61F 6/04 128/844 |
| 2003/0205694 | A1 * | 11/2003 | Sapienza | C09K 5/20 252/70 |

* cited by examiner

*Primary Examiner* — Peter F Godenschwager
(74) *Attorney, Agent, or Firm* — Im IP Law; Chai Im; C. Andrew Im

(57) ABSTRACT

A composition for controlling ambient humidity within 45%~55%. The composition includes at least one organic acid salt, at least one of polyol and water. The organic acid salt includes at least one of sodium lactate, potassium lactate and sodium formate. The count of carbon in the polyol is not greater than 5. The weight percentage of the organic acid salt in the composition is 30.6%-58.8%. The weight percentage of the polyol in the composition is 9.3%-26.7%. The composition can control the ambient humidity within 45%~55% without the need to pre-adjust the objective space. The composition has a large capacity of moisture absorption and desorption, and can quickly achieve the desired humidity in the objective environment.

4 Claims, No Drawings

COMPOSITION FOR CONTROLLING AMBIENT HUMIDITY

RELATED APPLICATIONS

This application is a § 371 application from PCT/CN2018/096461 filed Jul. 20, 2018, which claims priority from Chinese Patent Application No. 201810700453.3 filed Jun. 29, 2018, each of which is herein incorporated by reference in its entirety.

FIELD OF THE INVENTION

The present invention relates specifically to a composition for controlling ambient humidity.

BACKGROUND OF THE INVENTION

"Humidity" is an important factor that affects product packaging and storage life in all walks of life. Each product requires a reasonable humidity range to store. For example, camera lens requires to be stored within 45%-55% humidity range, the ambient humidity below the numerical value will make the rubber seal ageing, and the ambient humidity above the numerical value will make the lens foggy. The humidity to store products like wooden musical instruments is 45%-55%, the ambient humidity below the numerical value will cause wood deformation and may further affects the sound quality, and the ambient humidity above the numerical value will make wood moldy, or will make wood absorb a lot of moisture, causing the wood swell and damage wooden products.

In order to control the ambient humidity within 45%-55%, the common method is to use humidity control silica gel to control the ambient humidity. However, the use of humidity control silica gel is not in line with green products. During the production of humidity control silica gel, a lot of wastewater will be produced. In order to protect the environment, many silicone raw material factories are closed for rectification. This has led various industries to start to comprise desiccant product, which is the least important in the original list of materials table, in the procurement list of important materials.

Therefore, there is an urgent need for an alternative to humidity control silica gel, and the alternative must be in line with the green and environment theme.

SUMMARY OF THE INVENTION

The present invention is made for solving the above problems and aims to provide a composition for use in controlling ambient humidity.

The present invention provides a composition for use in controlling ambient humidity within 45%-55%, comprising: at least one of organic acid salt, at least one of polyols and water. Wherein the organic acid salt comprises at least one of sodium lactate, potassium lactate and sodium formate, the count of carbon in the polyols is not greater than 5, the weight percentage of the organic acid salt in the composition is 30.6%-58.8%, the weight percentage of the polyols in the composition is 9.3%-26.7%.

Further, the composition for use in controlling ambient humidity can also have the following features: wherein the weight percentage of the organic acid salt in the composition is 44.4%-46.2%, the weight percentage of the polyols in the composition is 13.3%-20.5%.

Further, the composition for use in controlling ambient humidity can also have the following features: wherein the organic acid salt is sodium lactate, the polyols is glycerol.

Further, the composition for use in controlling ambient humidity can also have the following features: wherein the organic acid salt is sodium lactate, the polyols is ethylene glycol.

Further, the composition for use in controlling ambient humidity can also have the following features: wherein the organic acid salt is sodium formate, the polyols is glycerol.

Further, the composition for use in controlling ambient humidity can also have the following features: wherein the organic acid salt is potassium lactate, the polyols is ethylene glycol.

Further, the composition for use in controlling ambient humidity can also have the following features: wherein there are two kinds of the organic acid salt, respectively sodium lactate and potassium lactate, the polyols is ethylene glycol, the weight percentage of the sodium lactate in the composition is 15.6%-45%, the weight percentage of the potassium lactate in the composition is 10%-30%, the total weight percentage of the sodium lactate and the potassium lactate in the composition is 30.6%-58.8%.

The Effect of the Present Invention

The composition for use in controlling ambient humidity according to the present invention comprises: at least one of organic acid salt, at least one of polyols and water. Wherein the organic acid salt comprises at least one of sodium lactate, potassium lactate and sodium formate, the count of carbon in the polyols is not greater than 5, the weight percentage of the organic acid salt in the composition is 30.6%-58.8%, the weight percentage of the polyols in the composition is 9.3%-26.7%. Therefore, the composition for use in controlling ambient humidity of the present invention can control the ambient humidity within 45%-55%, does not need to pre-adjust the objective space, has large capacity of moisture absorption and desorption and can quickly achieve the desired humidity in the objective environment.

Moreover, since the composition for use in controlling ambient humidity of the present invention comprises only sodium lactate, potassium lactate and sodium formate in common. The composition manufactured by using the organic salt is not only cheap, but also safe for human body when manufacturing, the composition can let the users rest assured because it does not corrode the camera lens or the instrument at all when protecting a camera lens or a wooden instrument. In addition, the composition is not only friendly to the natural environment in the manufacturing process, but also friendly to the natural environment after being discarded.

DETAILED DESCRIPTION OF THE PREFERRED EMBODIMENTS

Embodiment 1

The composition for use in controlling ambient humidity within 45%~55% comprises sodium lactate, glycerol and water. The weight percentage of sodium lactate in the composition is 30.6%-58.8%. The weight percentage of glycerol in the composition is 9.3%-26.7%.

The purity of the sodium lactate is not less than 99.9%. The purity of the glycerol is not less than 99.9%. The water is deionized water.

Embodiment 2

The composition for use in controlling ambient humidity within 45%-55% comprises sodium lactate, glycerol and water. The weight percentage of sodium lactate in the composition is 44.4%-46.2%. The weight percentage of glycerol in the composition is 13.3%-20.5%.

The purity of the sodium lactate is not less than 99.9%. The purity of the glycerol is not less than 99.9%. The water is deionized water.

Embodiment 3

The composition for use in controlling ambient humidity within 45%-55% comprises sodium lactate, ethylene glycol and water. The weight percentage of sodium lactate in the composition is 44.4%-46.2%. The weight percentage of ethylene glycol in the composition is 13.3%-20.5%.

The purity of the sodium lactate is not less than 99.9%. The purity of the ethylene glycol is not less than 99.9%. The water is deionized water.

When the weight percentage of the sodium lactate and the ethylene glycol is greater than the percentage range, crystallization is easy to occur in the composition which requires high temperature to dissolve, resulting in high loss and making the weight of the composition being unstable. When the weight percentage of the sodium lactate and the ethylene glycol is lower than the percentage range, it takes much longer time to manufacture the composition for use in controlling ambient humidity and the humidity control capability will decrease.

Embodiment 4

The composition for use in controlling ambient humidity within 45%-55% comprises sodium formate, ethylene glycol and water. The weight percentage of sodium formate in the composition is 44.4%-46.2%. The weight percentage of ethylene glycol in the composition is 13.3%-20.5%.

The purity of the sodium formate is not less than 99.9%. The purity of the ethylene glycol is not less than 99.9%. The water is deionized water.

Embodiment 5

The composition for use in controlling ambient humidity within 45%-55% comprises potassium lactate, glycerol and water. The weight percentage of potassium lactate in the composition is 44.4%-46.2%. The weight percentage of glycerol in the composition is 13.3%-20.5%.

The purity of the potassium lactate is not less than 99.9%. The purity of the glycerol is not less than 99.9%. The water is deionized water.

Embodiment 6

The composition for use in controlling ambient humidity within 45%-55% comprises potassium lactate, ethylene glycol and water. The weight percentage of potassium lactate in the composition is 44.4%-46.2%. The weight percentage of ethylene glycol in the composition is 13.3%-20.5%.

The purity of the potassium lactate is not less than 99.9%. The purity of the ethylene glycol is not less than 99.9%. The water is deionized water.

Embodiment 7

The composition for use in controlling ambient humidity within 45%-55% comprises sodium lactate, potassium lactate, ethylene glycol and water. The weight percentage of sodium lactate in the composition is 15.6%-45%. The weight percentage of potassium lactate in the composition is 10%-30%. The total weight percentage of sodium lactate and potassium lactate in the composition is 30.6%-58.8%. The weight percentage of ethylene glycol in the composition is 13.3%-20.5%.

The purity of the sodium lactate is not less than 99.9%. The purity of the potassium lactate is not less than 99.9%. The purity of the ethylene glycol is not less than 99.9%. The water is deionized water.

Take the embodiment 2 as an example, the weight percentage of sodium lactate, glycerol and water in the composition for use in controlling different humidity, respectively is

| Ambient humidity (%) | Sodium lactate (%) | Glycerol (%) | $H_2O$ (%) |
|---|---|---|---|
| 45 | 45.5 | 20.5 | 34.0 |
| 50 | 46.2 | 16.1 | 37.7 |
| 55 | 44.4 | 13.3 | 42.3 |

The Effect of the Embodiments

The composition for use in controlling ambient humidity according to the foregoing embodiments comprises: at least one of organic acid salt, at least one of polyols and water, wherein the organic acid salt comprises at least one of sodium lactate, potassium lactate and sodium formate, the count of carbon in the polyols is not greater than 5, the weight percentage of the organic acid salt in the composition is 30.6%-58.8%, the weight percentage of the polyols in the composition is 9.3%-26.7%. Therefore, the composition for use in controlling ambient humidity of the foregoing embodiments can control the ambient humidity within 45%-55%, does not need to pre-adjust the objective space, has large capacity of moisture absorption and desorption and can quickly achieve the desired humidity in the objective environment.

Moreover, since the composition for use in controlling ambient humidity of the foregoing embodiments comprises only sodium lactate, potassium lactate and sodium formate in common. The composition manufactured by using the organic salts is not only cheap, but also safe for human body when manufacturing, the composition can let the users rest assured because it does not corrode the camera lens or the instrument at all when protecting a camera lens or a wooden instrument. In addition, the composition is not only friendly to the natural environment in the manufacturing process, but also friendly to the natural environment after being discarded.

The foregoing embodiments are preferred cases of the present invention and is not used to limit the scope of protection of the present invention.

In the foregoing embodiments, the polyols of the humidity control composition for use in controlling ambient humidity are glycerol and ethylene glycol, however, polyols with a carbon content of not more than 5 can achieve the same effect as a component of the humidity control composition in the composition for use in controlling ambient humidity of the present invention.

The invention claimed is:
1. An ambient humidity controlling composition for controlling ambient humidity within 45%-55%, comprising:

an organic acid salt, at least one polyol and water;
the organic acid salt is sodium lactate;
said at least one polyol is ethylene glycol;
a weight percentage of the organic acid salt in the composition is 44.4%-46.2%; and
a weight percentage of said at least one polyol in the composition is 13.3%-20.5%.

2. The ambient humidity controlling composition for controlling ambient humidity according to claim 1, wherein the controlling ambient humidity is 45%, the weight percentage of the organic acid salt in the composition is 45.5%, and the weight percentage of said at least one polyol in the composition is 20.5%.

3. The ambient humidity controlling composition for controlling ambient humidity according to claim 1, wherein the controlling ambient humidity is 50%, the weight percentage of the organic acid salt in the composition is 46.2%, and the weight percentage of said at least one polyol in the composition is 16.1%.

4. The ambient humidity controlling composition for controlling ambient humidity according to claim 1, wherein the controlling ambient humidity is 55%, the weight percentage of the organic acid salt in the composition is 44.4%, and the weight percentage of said at least one polyol in the composition is 13.3%.

* * * * *